US011050773B2

(12) United States Patent
Will et al.

(10) Patent No.: US 11,050,773 B2
(45) Date of Patent: Jun. 29, 2021

(54) SELECTING SECURITY INCIDENTS FOR ADVANCED AUTOMATIC ANALYSIS

(71) Applicant: International Business Machines Corporation, Armonk, NY (US)

(72) Inventors: Stephen C. Will, Raleigh, NC (US); Kevin Tabb, Decatur, GA (US); Ilgen B. Yuceer, London (GB); Sulakshan Vajipayajula, Bangalore (IN); Kaushal K. Kapadia, Alpharetta, GA (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 16/238,930

(22) Filed: Jan. 3, 2019

(65) Prior Publication Data

US 2020/0220885 A1 Jul. 9, 2020

(51) Int. Cl.
*G06F 21/00* (2013.01)
*H04L 29/06* (2006.01)
*G06F 16/2457* (2019.01)
*G06N 20/00* (2019.01)

(52) U.S. Cl.
CPC .... *H04L 63/1425* (2013.01); *G06F 16/24578* (2019.01); *H04L 63/145* (2013.01); *G06N 20/00* (2019.01)

(58) Field of Classification Search
None
See application file for complete search history.

(56) References Cited

U.S. PATENT DOCUMENTS

| 8,613,083 | B1 | 12/2013 | Njemanze et al. |
| 8,776,241 | B2 | 7/2014 | Zaitsev |
| 9,398,035 | B2 * | 7/2016 | Vasseur ............... H04L 63/1441 |
| 9,444,829 | B1 * | 9/2016 | Ashley .................... G06F 16/90 |
| 9,450,978 | B2 * | 9/2016 | Vasseur .................... G06N 3/02 |
| 10,419,269 | B2 * | 9/2019 | Danichev .......... H04L 29/06891 |
| 2004/0260947 | A1 * | 12/2004 | Brady ............ H04L 63/1425 726/23 |

(Continued)

FOREIGN PATENT DOCUMENTS

CN 105282178 A 1/2016

OTHER PUBLICATIONS

Tamjidyamcholo, Alireza et al. Application of fuzzy set theory to evaluate the rate of aggregative risk in information security. 2013 International Conference on Research and Innovation in Information Systems (ICRIIS). https://ieeexplore.IEEE.org/stamp/stamp.jsp?tp=&arnumber=6716745 (Year: 2013).*

(Continued)

*Primary Examiner* — Jeremiah L Avery
(74) *Attorney, Agent, or Firm* — Yee & Associates, P.C.

(57) ABSTRACT

Prioritizing security incidents for analysis is provided. A set of security information and event management data corresponding to each of a set of security incidents is retrieved. A source weight of a security incident and a magnitude of the security incident are used to determine a priority of the security incident within the set of security incidents. A local analysis of the security incident is performed based on the retrieved set of security information and event management data corresponding to the security incident and the determined priority of the security incident.

20 Claims, 11 Drawing Sheets

(56) References Cited

U.S. PATENT DOCUMENTS

2016/0300252 A1* 10/2016 Frank ................ G06F 16/24578
2017/0243131 A1* 8/2017 Kephart ................ G06F 16/00
2018/0048661 A1 2/2018 Bird et al.
2018/0084001 A1 3/2018 Hudis et al.
2018/0097834 A1* 4/2018 Bailey, Jr. ............. G06F 21/552

OTHER PUBLICATIONS

Collier, Zachary A. et al. Cybersecurity Standards: Managing Risk and Creating Resilience. Computer, vol. 47, Issue: 9. https://ieeexplore.ieee.org/stamp/stamp.jsp?tp=&arnumber=6701301 (Year: 2014).*

Mell et al., "The NIST Definition of Cloud Computing," National Institute of Standards and Technology Special Publication 800-145, Sep. 2011, 7 pages.

Cichinski, et al., "Computer Security Incident Handling Guide," Recommendations of the National Institute of Standards and Technology Special Publication 800-61 Revision 2, Aug. 2012, 79 pages.

"Offense prioritization," QRadarSIEM, Accessed on Dec. 26, 2018, 4 pp., https://www.ibm.com/support/knowledgecenter/en/SS42VS_7.3.0/com.ibm.qradar.doc/c_qradar_ug_offense_magnitude.html.

* cited by examiner

SELECTING SECURITY INCIDENTS FOR ADVANCED AUTOMATIC ANALYSIS

BACKGROUND

1. Field

The disclosure relates generally to information security and more specifically to identifying and selecting security incidents reported in security information and event management data for advanced automatic analysis utilizing local contextual data and remote cognitive security data and analytics.

2. Description of the Related Art

Information security is the practice of preventing unauthorized access, use, disclosure, disruption, modification, inspection, recording, or destruction of information or data. The information or data may take electronic form, for example. Information security's primary focus is balanced protection of the confidentiality, integrity, and availability of the information or data while maintaining a focus on efficient policy implementation, all without hampering productivity. This is largely achieved through a multi-step risk management process that identifies assets, threat sources, vulnerabilities, potential impacts, and possible controls, followed by assessment of the effectiveness of the risk management plan.

Information security threats come in many different forms. Some of the most common threats today are software attacks, theft of intellectual property, identity theft, theft of information, sabotage, and information extortion. Most people and organizations have experienced some sort of software attack. Viruses, worms, spyware, scareware, phishing attacks, and Trojan horses are a few common examples of software attacks. Identity theft is the attempt to act as someone else usually to obtain that person's personal information or to take advantage of their access to vital information. Theft of information is becoming more prevalent today due to the fact that most devices today are mobile connecting to unsecure networks. Sabotage usually consists of disruption of an organization's website in an attempt to prevent customer access. Information extortion consists of theft of an organization's information as an attempt to receive a payment in exchange for returning the information (e.g., ransomware).

Possible responses to a security risk or threat are, for example: 1) reduce or mitigate the security risk by implementing safeguards and countermeasures to eliminate vulnerabilities or block threats; 2) assign or transfer the security risk by placing the cost of the threat to another entity such as purchasing insurance or outsourcing; and 3) accept the security risk by evaluating whether the cost of a countermeasure outweighs the possible cost of loss due to the threat.

In the field of computer security, security information and event management software products and services combine security information management and security event management. These security information and event management software products and services provide real-time analysis of security alerts generated by applications and network hardware. Also, these security information and event management software products and services are used to log security data and generate reports for compliance purposes.

SUMMARY

According to one illustrative embodiment, a computer-implemented method for prioritizing security incidents for analysis is provided. A set of security information and event management data corresponding to each of a set of security incidents is retrieved. A source weight of a security incident and a magnitude of the security incident are used to determine a priority of the security incident within the set of security incidents. A local analysis of the security incident is performed based on the retrieved set of security information and event management data corresponding to the security incident and the determined priority of the security incident. According to other illustrative embodiments, a computer system and computer program product for prioritizing security incidents for analysis are provided.

DETAILED DESCRIPTION

Figure 1:
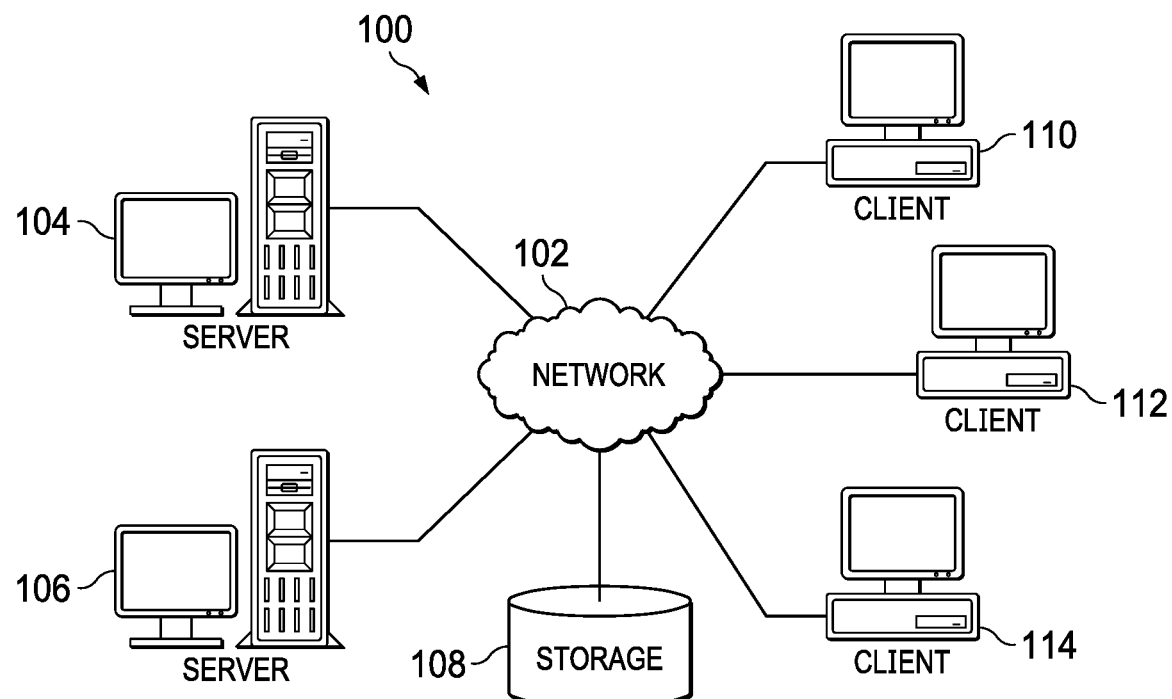
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide one or more services, such as, for example, event monitoring services, financial services, banking services, governmental services, educational services, reservation services, real-time data services, gaming services, search services, and the like, to client devices. Also, it should be noted that server 104 and server 106 may each represent a cluster of servers in one or more data centers, for example.

Further, server 104 and server 106 may each include a security information and event manager. However, it should be noted that the security information and event manager may be located on a separate server instead of or in addition to server 104 and server 106. The security information and event manager monitors, logs, and aggregates relevant security information and event data corresponding to the services provided by server 104 and server 106 to identify deviations from the norm and take appropriate action when indicated. For example, when the security information and event manager detects a potential issue, the security information and event manager logs and analyzes the information, generates a security incident alert based on the analysis, and may instruct other security controls to stop progress of suspicious activity corresponding to a provided service. The security information and event manager may be, for example, a rules-based engine or a statistical correlation engine to establish relationships between security event log entries. The security information and event manager may also include user behavior analytics components and security orchestration and automated response components.

Furthermore, server 104 and server 106 may send security incidents to a cloud-based platform for further analysis by a cognitive machine learning application based on identified characteristics of the security incidents discovered during local analysis by the security information and event manager. The identified characteristics may include, for example, that an observable is linked to a security incident, that the observable is listed in private or public threat intelligence data, that the observable has a security risk score above a threshold, that the observable is a known malware hash or antivirus signature is linked to the security incident, that execution of the observable, which is a file, is linked to the security incident, that the observable is an asset linked to the security incident that has an asset weight greater than an asset weight threshold, and the like. An observable is information detected in logs on the security information and event manager that corresponds to information that security analysts find interesting. This information of interest to security analysts may be, for example, a particular IP address, username, file hash, file name, registry key, or the like. An asset weight is the relative value of an asset for an organization or enterprise as defined by a security information and event manager administrator.

A security incident is an indication that a security risk or threat exists to information or computer security. A security incident may be an aggregation of a plurality of detected security events augmented with other security information, such as, for example, security incident source weight, security incident magnitude level, security incident start time, security risk level, application vulnerabilities associated with the security incident, threat intelligence data associated with the security incident, and the like. The security information and event manager identifies security risks or threats by unauthorized access to server 104 or server 106, for example. A security incident can, for example, result in misuse of confidential information stored on server 104 and server 106. This may include confidential information, such as social security numbers, credit card numbers, bank account numbers, financial records, health records, or any other information that includes sensitive or personally identifiable information.

Client 110, client 112, and client 114 also connect to network 102. Clients 110, 112, and 114 are clients of server 104 and/or server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, gaming devices, and the like. Users of clients 110, 112, and 114 may utilize clients 110, 112, and 114 to access and utilize the services provided by server 104 and/or server 106. However, it should be noted that a user of a client device may also perform unintended or intended malicious activity regarding a service provided by server 104 or server 106.

Storage 108 is a network storage device capable of storing any type of data in a structured format or an unstructured format. In addition, storage 108 may represent a plurality of network storage devices. Further, storage 108 may store one or more security incident databases containing a plurality of security incidents, along with their corresponding descriptions, source weights, magnitude levels, and the like. Furthermore, storage unit 108 may store other types of data, such as authentication or credential data that may include user names, passwords, and biometric data associated with users, such as, for example, system administrators and security analysts.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a metropolitan area network (MAN), a wide area network (WAN), a telecommunications network, or any combination thereof. FIG. 1 is intended as an example only, and not as an architectural limitation for the different illustrative embodiments.

Figure 2:
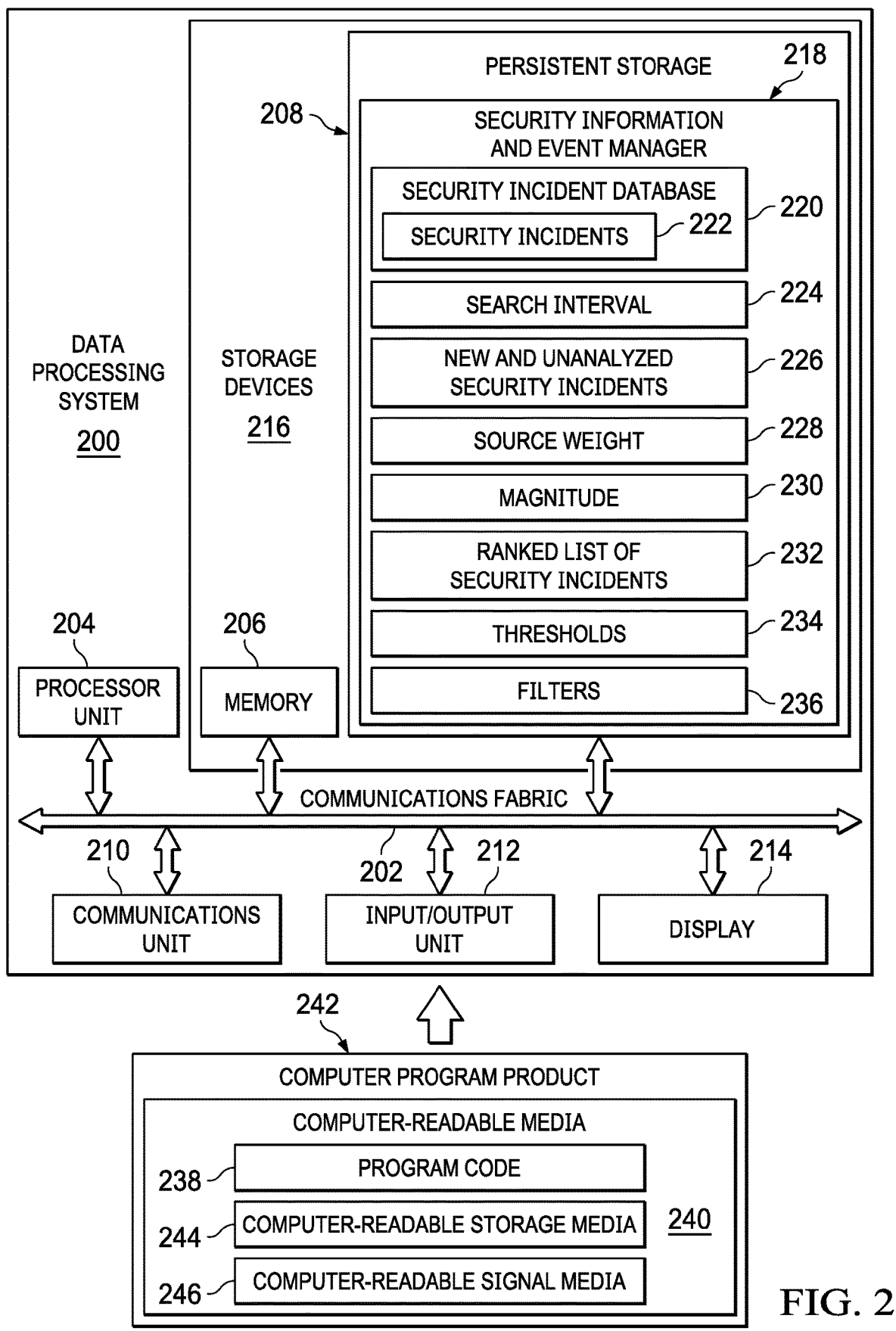
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. Data processing system 200 provides services to client devices, such as clients 110, 112, and 114 in FIG. 1. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores security information and event manager 218. However, it should be noted that even though security information and event manager 218 is illustrated as residing in persistent storage 208, in an alternative illustrative embodiment security information and event manager 218 may be a separate component of data processing system 200. For example, security information and event manager 218 may be a hardware component coupled to communication fabric 202 or a combination of hardware and software components. In another alternative illustrative embodiment, a first set of components of security information and event manager 218 may be located in data processing system 200 and a set of components of security information and event manager 218 may be located in a second data processing system, such as, for example, server 106. In yet another alternative illustrative embodiment, security information and event manager 218 may be located in another data processing system in addition to or instead of data processing system 200.

Security information and event manager 218 controls the process of selecting only certain security incidents for local and remote analysis. Thus, security information and event manager 218 saves resources (e.g., processor cycles, memory, storage, and the like) of data processing system 200, thereby increasing performance of data processing system 200 to execute services provided by data processing system 200. In this example, security information and event manager 218 includes security incident database 220, which contains security incidents 222. However, it should be noted that in an alternative illustrative embodiment security incident database 220 may be located in a separate storage device, such as storage 108 in FIG. 1. Security incidents 222 represent information corresponding to a plurality of different security events regarding the one or more services provided by data processing system 200.

Search interval 224 represents a predefined time interval, such as, for example, hourly, daily, weekly, monthly, or any other increment of time. Security information and event manager 218 utilizes search interval 224 to determine when to search security incident database 220 for new and unanalyzed security incidents 226. New and unanalyzed security incidents 226 are a subset of security incidents 222. New and unanalyzed security incidents 226 represent those security incidents that are new security incidents or unanalyzed security incidents since the last search interval 224.

Source weight 228 represents a predefined weight assigned by a system administrator or security analyst to a source of a security incident, such as a particular username, Internet Protocol (IP) address, file name, or the like. Magnitude 230 represents a magnitude score or value provided by security information and event manger 218 for a security incident. Security information and event manger 218 utilizes source weight 228 and magnitude 230 corresponding to each particular security incident in new and unanalyzed security incidents 226 to rank and prioritize each of new and unanalyzed security incidents 226. Security information and event manger 218 generates ranked list of security incidents 232 based on rankings corresponding to new and unanalyzed security incidents 226.

Security information and event manger 218 applies thresholds 234 and filters 236 to highest-ranking security incidents in ranked list of security incidents 232 to determine which security incidents to analyze locally. Thresholds 234 may include, for example, security incident times and magnitude thresholds. Security incident times may include, for example, date security incident began, date the security incident was last updated, date of first activity of the security incident, date of last activity of the security incident, which is different from date of last update, and the like. Filters 236 may include, for example, security incident source and category filters. Further, during local analysis of the security incidents, security information and event manger 218 may identify one or more characteristics associated with each security incident. The characteristics may include, for example, whether observables are linked to security incidents, whether the observables are listed in private or public threat intelligence data, whether the observables have security risk scores above a threshold, whether the observables are known malware hashes or antivirus signatures linked to security incidents, whether execution of the observables, which are files, are linked to security incidents, whether the observables are assets, which are linked to security incidents, having an asset weight greater than an asset weight threshold, and the like. If security information and event manger 218 discovers that a particular security incident has one or more of the above characteristics, then security information and event manger 218 sends that particular security incident for remote analysis by a cloud-based platform.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
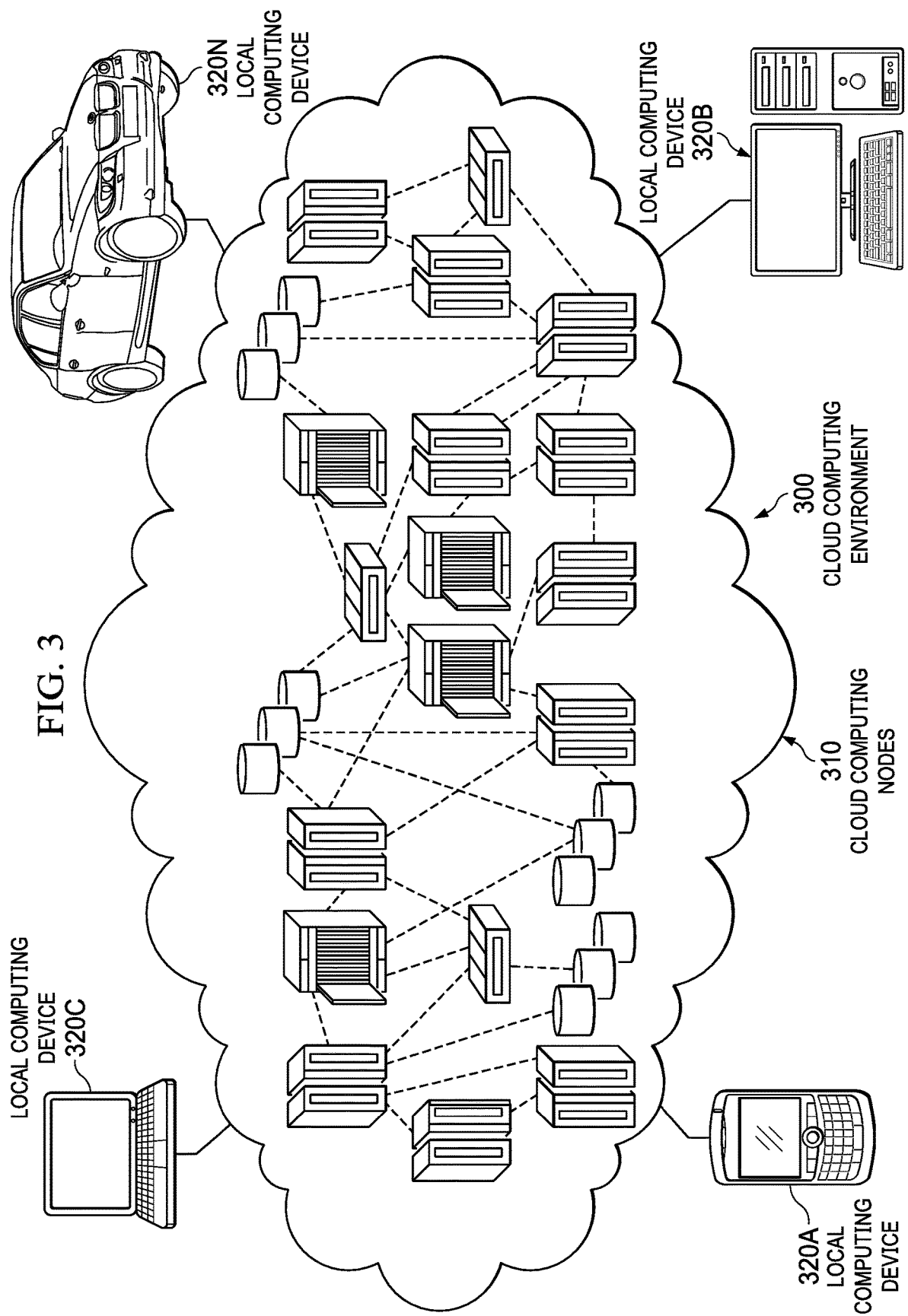
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
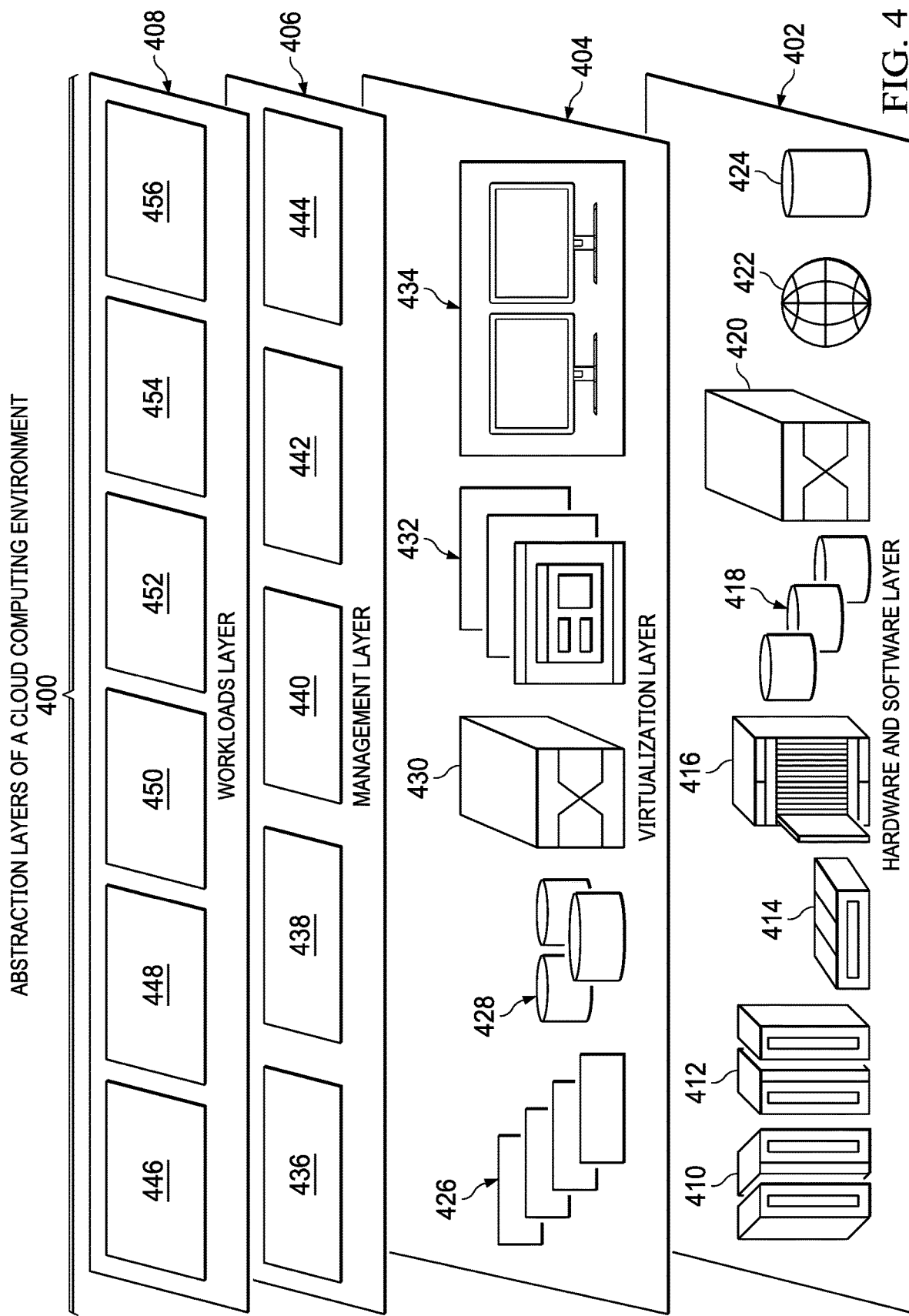
FIG. 4 is a diagram illustrating an example of abstraction layers of a cloud computing environment in accordance with an illustrative embodiment.
Figure 5A:
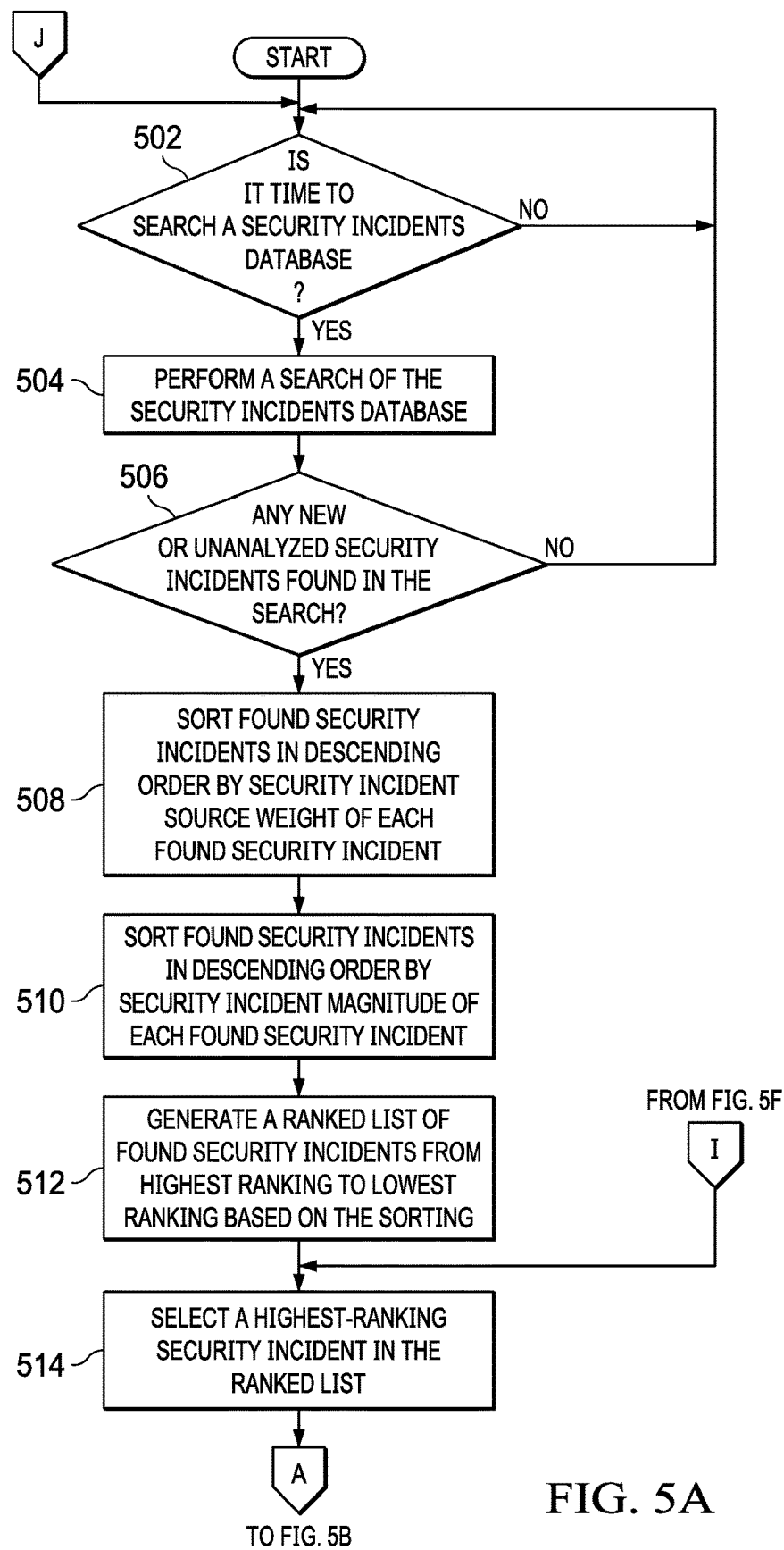
FIGS. 5A-5F is a flowchart illustrating a process for selecting security incidents for local and remote analysis in accordance with an illustrative embodiment.
Figure 5B:
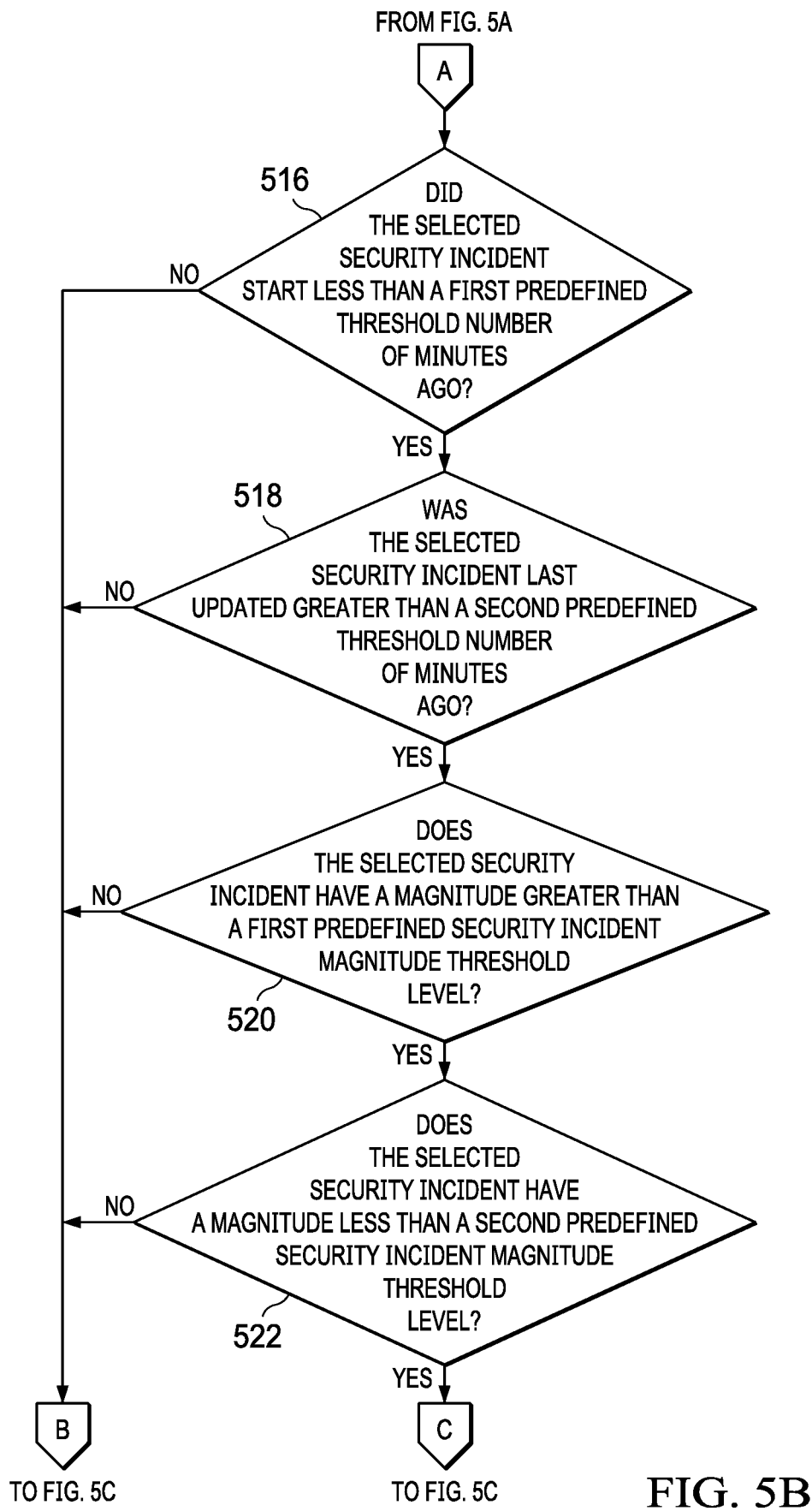
Figure 5C:
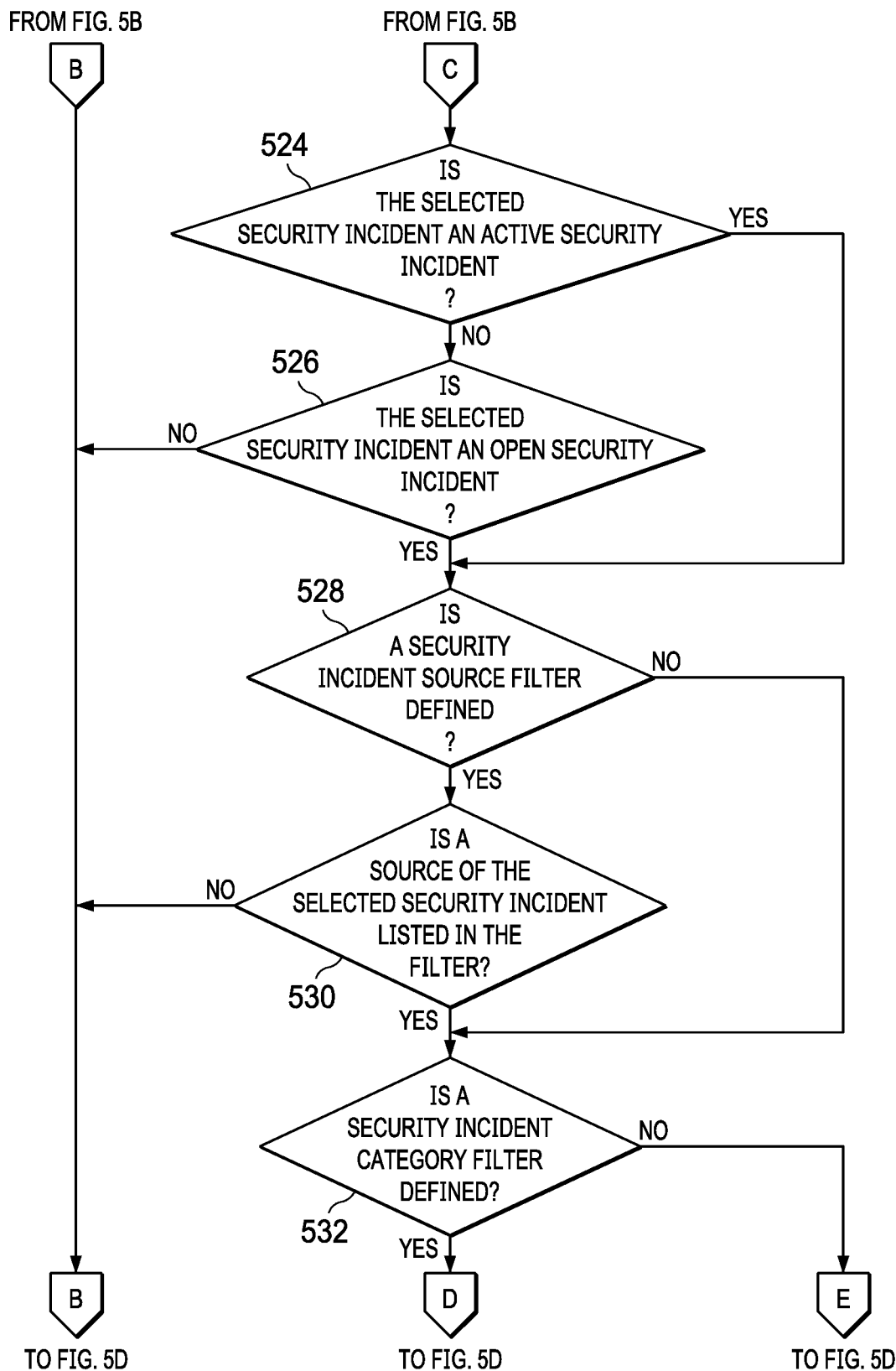
Figure 5D:
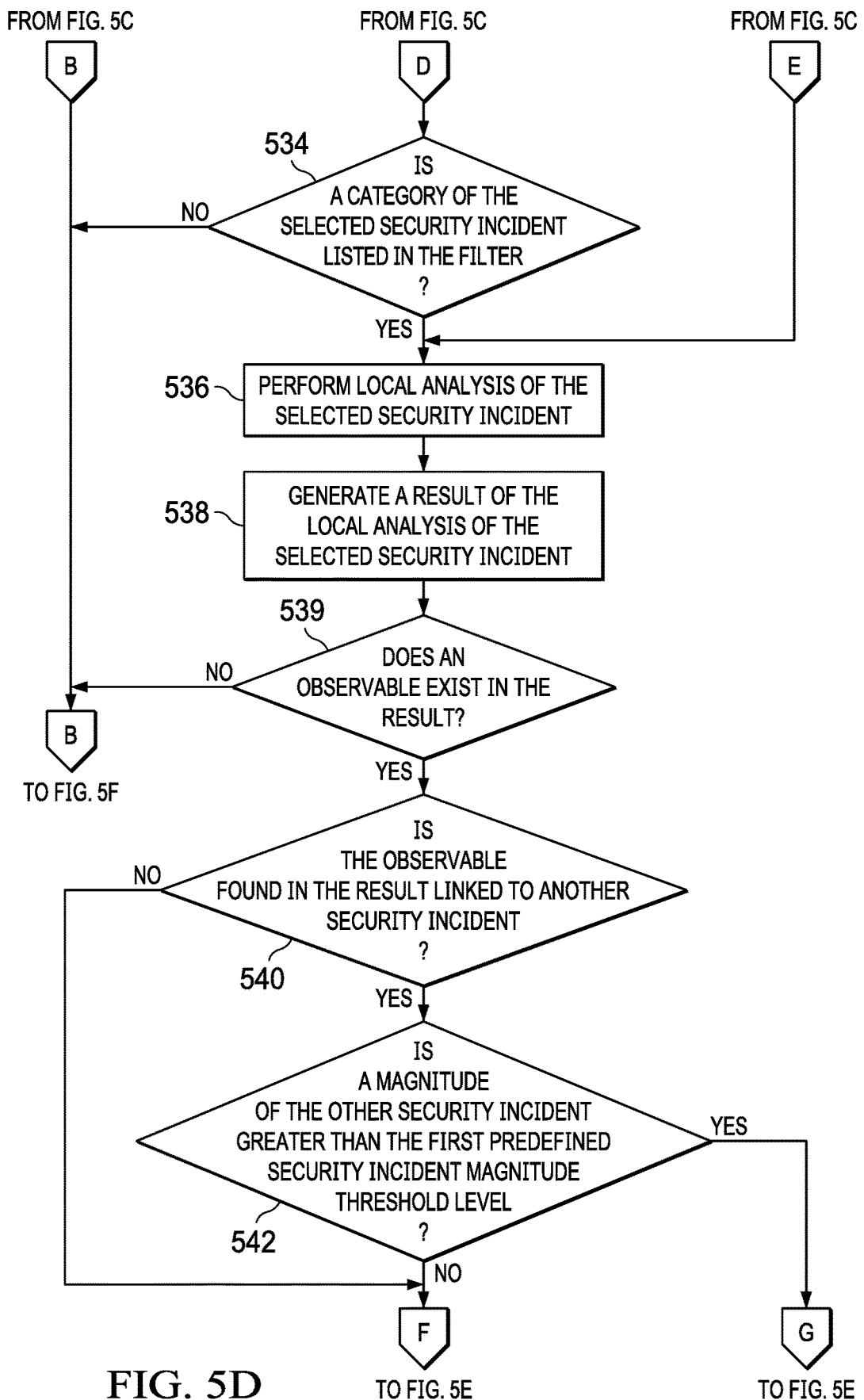
Figure 5E:
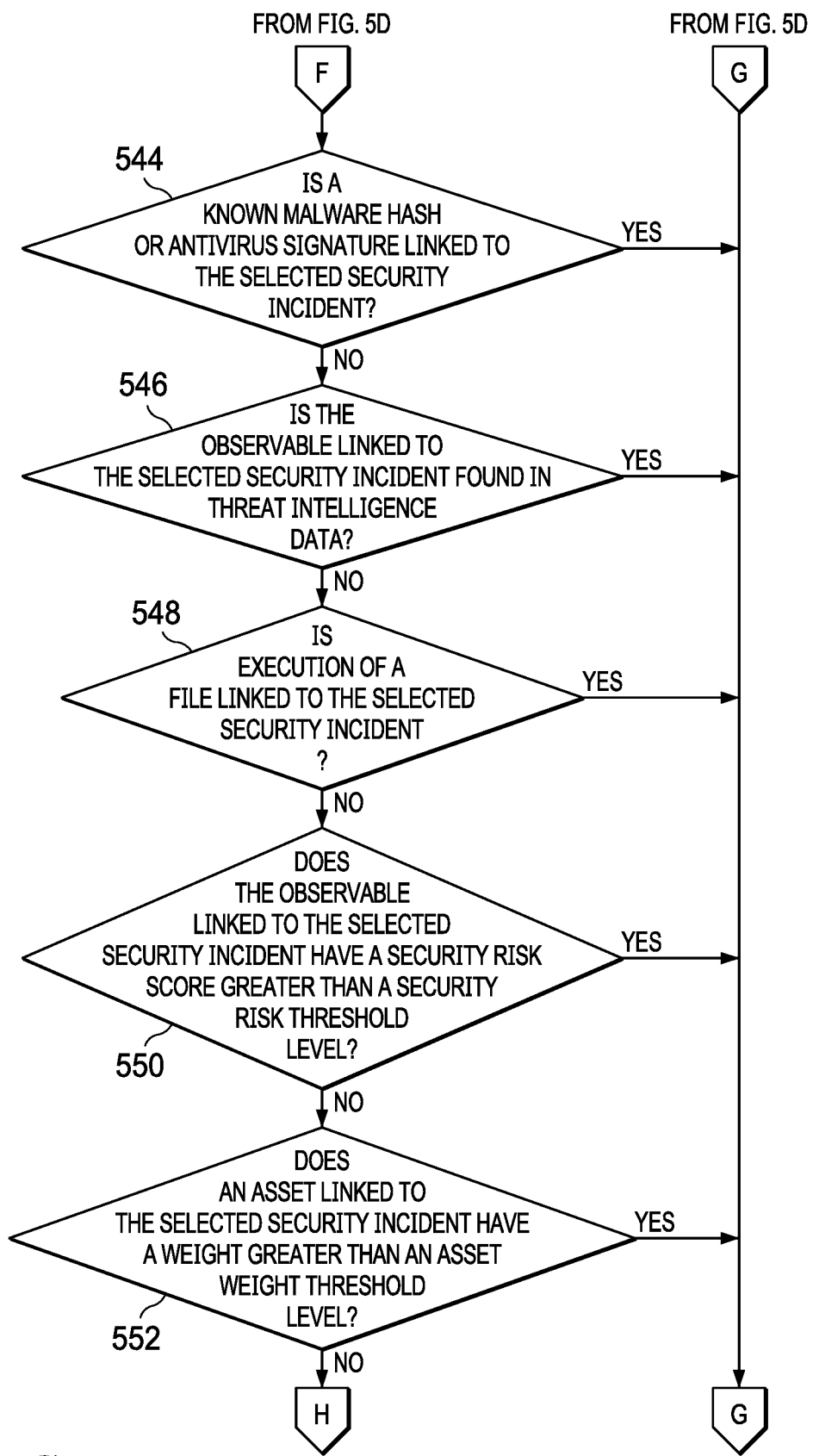
Figure 5F:
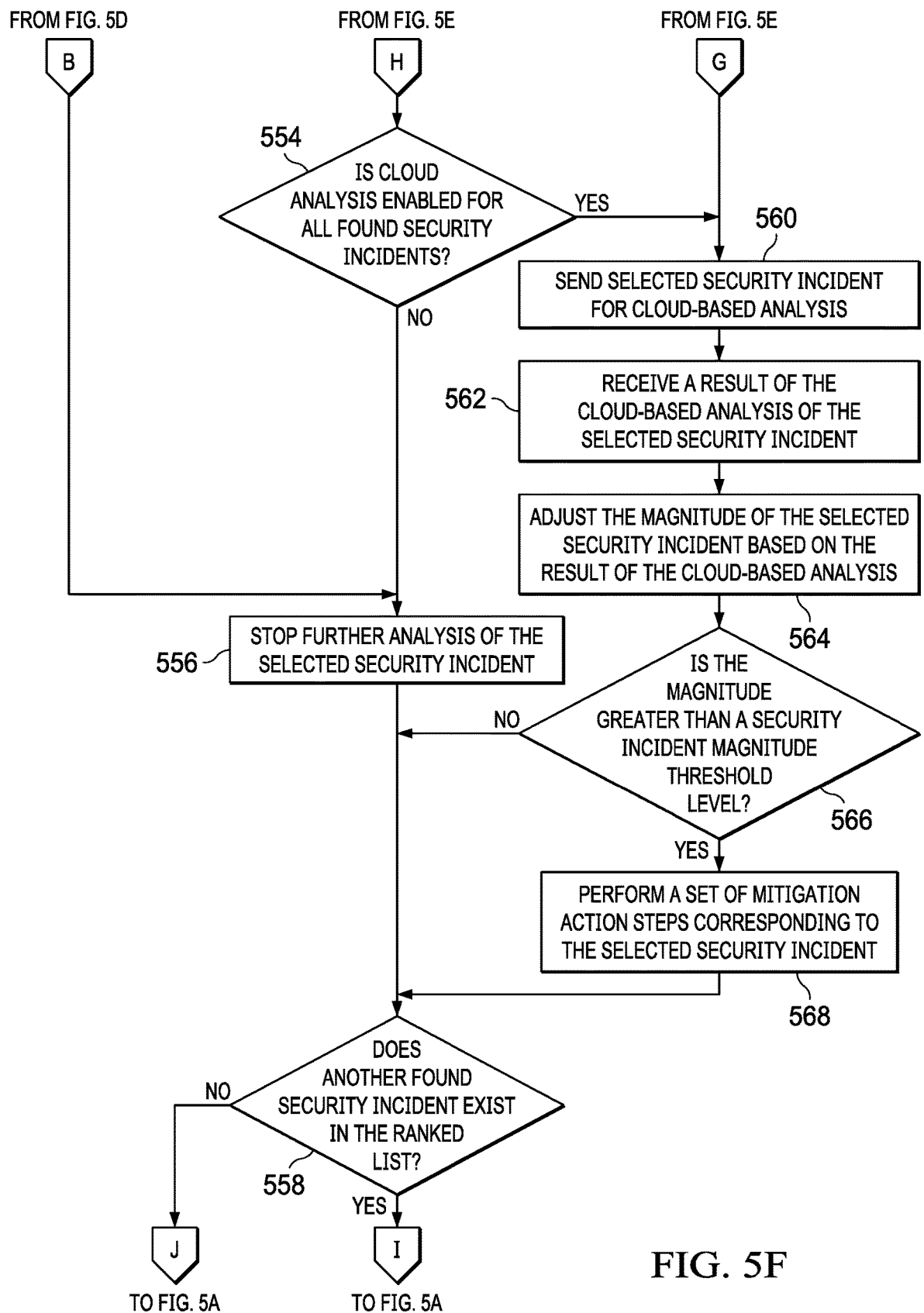

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and security incident analytics 456.

Typically, a security analyst is overwhelmed by the sheer number of security incidents that the security analyst must deal with every day within a security information and event management system environment. Current security information and event management systems can automatically investigate these security incidents, but even these current security information and event management systems cannot investigate every single security incident at scale. In addition, these current security information and event management systems cannot identify the urgency for security incident responses by automatically identifying and analyzing important and relevant security incidents. The use of cloud-based security incident analysis for every security incident reported by a security information and event management system also is not optimal. For example, not all security incidents benefit from cloud-based analysis that deal with observables that are mostly contained in ingress or egress data. In addition, issues exist regarding cost, scalability, and license usage associated with cloud-based analysis of all local security incidents.

Illustrative embodiments select certain reported security incidents for cloud-based analysis by applying insights derived from local and remote contexts. In other words, illustrative embodiments optimally utilize automatic investigation of security incidents reported by a security information and event management system by selecting security incidents based on a plurality of local and remote environment contextual factors. The local environment contextual factors may include, for example, a magnitude score of a security incident exceeding a security incident magnitude threshold level defined by the security information and event management system; a status of the security incident (e.g., whether or not the security incident is currently under analysis); a source of the security incident (e.g., a particular user identifier, IP address, rule, or the like); and a category of the security incident (e.g., denial of service attack, malware detection, anomalous user behavior, or the like). The remote environment contextual factors may include, for example, a known malicious hash or antivirus signature linked to the security incident; detected execution of malware associated with the security incident; and indicators related to the security incident that are associated with advanced kill chain stage, such as, for example Command and Control instructions or data exfiltration. Command and Control instructions are issued by a malicious user to take control of a computer system remotely. Data exfiltration is the unauthorized transfer of data from a computer system. Such a transfer may be automated and carried out through malicious programming over a network.

Illustrative embodiments prioritize security incidents based on information and data corresponding to those security incidents. Illustrative embodiments identify security incidents that need cloud-based security incident analytics by using, for example, information and data provided by the security information and event management system; identification of a "root" of a security incident (i.e., an object, such as a person or computer, that is the center of, or key to, the security incident) to prioritize analysis of the security incident; identification of a current analysis status of the security incident (i.e., whether or not the security incident is still active or open) to prioritize analysis of the security incident; identification of a category of the security incident (e.g., denial of service attack, detection of malware, anomalous user behavior, or the like) to prioritize analysis of the security incident.

Illustrative embodiments optimally utilize cloud-based security incident analysis based on applying unique criteria to determine the need for cognitive analytics. For example, illustrative embodiments identify security incidents containing observables found in private or public threat intelligence data; identification of observable data intelligence indicating correspondence to an advanced cyber kill chain stage; and identification of antivirus signatures or hashes associated with malware noted in the security incident. Illustrative embodiments utilize discovered and user-provided criteria for determining whether a security incident is to be investigated further by a cloud-based platform. Further, illustrative embodiments assess the magnitude of a response corresponding to the security incident post cloud-based analytics by utilizing output of a cognitive analytics component that indicates data breach, active malware campaign, or applicability to a security incident domain, for example.

However, it should be noted that illustrative embodiments are not merely performing local or cloud-based security incident analytics. In other words, illustrative embodiments are not merely generating information or data to be used to determine security incident root, security incident category, or whether the security incident is still active or open. Instead, illustrative embodiments are utilizing this information and data to prioritize the analysis of such a security incident.

First, illustrative embodiments determine whether a security incident is to be analyzed locally on a computer system. Local analysis is analysis of a security incident performed entirely on the security information and events manager of the local computer system and performed with data contained within the security information and events manager. Illustrative embodiments begin by querying the security information and event manager on a preset time interval basis to determine whether any new or unanalyzed security incidents are found in a security incident database of the security information and event manager. Illustrative embodiments then sort found security incidents in descending order of priority according to the weight of each security incident's source, which is provided by the security information and event manager, when the source of a security incident is an asset connected to the network. An asset is any data, document, device, or other component of the local computer system environment that supports information-related activities. In addition, illustrative embodiments continue to sort the found security incidents in descending order of priority according to the magnitude value of each found security incident, which also is provided by the security information and event manager. It should be noted that if illustrative embodiments have already analyzed a found security incident, illustrative embodiments do not analyze that particular security incident again.

Further, illustrative embodiments filter the found security incidents by whether the security incidents started less than a first predefined number of minutes ago and were last updated greater than a second predefined number of minutes ago. Furthermore, illustrative embodiments continue filtering the found security incidents based on whether the security information and event manager-provided magnitude value of each security incident is greater than a first security incident magnitude threshold value and less than a second security incident magnitude threshold value. Moreover, illustrative embodiments filter the found security incidents based on whether the security incidents are active security incidents or open security incidents (e.g., not previously closed). An active security incident is a security incident that the security information and event manager has recently categorized events or flows for that security incident within the last defined "X" number of minutes. An open security incident is a security incident that has not been marked as closed or analyzed in the security information and event manager and has not been removed due to data retention.

Illustrative embodiments further determine whether a user, such as a system administrator or security analyst, defined a security incident source (i.e., root) filter for the found security incidents and whether sources of the found security incidents are listed in the defined security incident source filter. A security incident source filter is a filter that can optionally be defined by the user and is used as a whitelist for security incident sources. If illustrative embodiments find that a security incident is listed in the security incident source filter, then illustrative embodiments analyze that security incident. In addition, illustrative embodiments determine whether the user defined a security incident category filter for the found security incidents and whether categories corresponding to the found security incidents are listed in the defined security incident category filter. A security incident category filter is a filter that can optionally be defined by the user and is used as a whitelist for security incident categories. A security incident category is a security information and event manager-provided category for a security incident based on events or data contained in that security incident. If illustrative embodiments find that a security incident is listed in the security incident category filter, then illustrative embodiments analyze that security incident.

Afterward, illustrative embodiments determine whether a particular security incident is to be analyzed by a cloud-based platform. Cloud-based analysis is analysis of a security incident based on data contained in the cloud-based platform and performed in an application that is hosted in the cloud-based platform. In other words, after illustrative embodiments have completed the security incident analysis using the security information and event manager on the local computer system, then illustrative embodiments may optionally send analysis of a particular security incident for analysis by the cloud-based platform. The cloud-based platform utilizes more security incident data received from other security information and event management systems and other security information sources and also utilizes its higher-level of processing power to perform the cognitive security incident analysis.

Illustrative embodiments send a particular security incident for cloud-based analysis when one of a plurality of different conditions are met. For example, illustrative embodiments send a security incident for cloud-based analysis in response to determining that an observable is linked to the security incident and the magnitude of the security incident is greater than the first security incident magnitude threshold value. An observable is a piece of data gleaned from log activity on the security information and event manager corresponding to information that security analysts commonly are interested in. This information of interest to security analysts may be, for example, a particular IP address, username, file hash, file name, registry key, or the like. Or, illustrative embodiments send the security incident for cloud-based analysis in response to determining that a known malware hash or antivirus signature is linked to the security incident. Or, illustrative embodiments send the security incident for cloud-based analysis in response to determining that execution of a file (i.e., any file) in the local computer system is linked to the security incident. Or, illustrative embodiments send the security incident for cloud-based analysis in response to determining that the observable linked to the security incident was found in private threat intelligence information. Private threat intelligence information is sets of possible observables defined by the system administrator in the security information and event manager that are known to the administrator's organization or enterprise as being risky (i.e., presenting a security risk to assets connected to the network). Or, illustrative embodiments send the security incident for cloud-based analysis in response to determining that the observable linked to the security incident has a security risk score greater than a security risk threshold level. Or, illustrative embodiments send the security incident for cloud-based analysis in response to determining that an asset connected to the network is linked to the security incident and that the asset has a predefined asset weight greater than an asset weight threshold level. An asset weight is the relative value of an asset for the organization or enterprise as defined by the security information and event manager administrator. Or, illustrative embodiments send the security incident for cloud-based analysis in response to determining that the user enabled cloud-based analysis for all found security incidents.

With reference now to FIGS. 5A-5F, a flowchart illustrating a process for selecting security incidents for local and remote analysis is shown in accordance with an illustrative embodiment. The process shown in FIGS. 5A-5F may be implemented in a computer, such as, for example, server 104 in FIG. 1.

The process begins when the computer determines whether it is time to search a security incidents database, such as security incidents database 220 in FIG. 2 (step 502). The computer may use for example, a time interval, such as search interval 224 in FIG. 2, to determine when it is time to perform a search of the security incidents database. If the computer determines that it is not time to search the security incidents database, no output of step 502, then the process returns to step 502 where the computer waits until it is time to perform a search. If the computer determines that it is time to search the security incidents database, yes output of step 502, then the computer performs the search of the security incidents database (step 504).

The computer makes a determination as to whether the computer found any new or unanalyzed security incidents during the search of the security incidents database (step 506). If the computer determines that no new or unanalyzed security incidents were found during the search of the security incidents database, no output of step 506, then the process returns to step 502 where the computer waits until it is time to perform another search of the security incidents database. If the computer determines that one or more new or unanalyzed security incidents were found during the search of the security incidents database, yes output of step 506, then the computer sorts found security incidents in descending order by security incident source weight, such as source weight 228 in FIG. 2, of each found security incident (step 508). Further, the computer again sorts the found security incidents in descending order by security incident magnitude, such as magnitude 230 in FIG. 2, of each found security incident (step 510).

Afterward, the computer generates a ranked list of the found security incidents from highest ranking to lowest ranking based on the sorting according to source weight and magnitude of each found security incident (step 512). The computer selects a highest-ranking security incident in the ranked list (step 514). The computer makes a determination as to whether the selected security incident started less than a first predefined threshold number of minutes ago (step 516). The first predefined threshold number of minutes may be, for example, 1 minute, 5 minutes, 10 minutes, or the like.

If the computer determines that the selected security incident started after the first predefined threshold number of minutes (i.e., greater than the first predefined threshold number of minutes ago), no output of step 516, then the process proceeds to step 556. If the computer determines that the selected security incident started before the first predefined threshold number of minutes (i.e., less than the first predefined threshold number of minutes ago), yes output of step 516, then the computer makes a determination as to whether the selected security incident was last updated greater than a second predefined threshold number of minutes ago (step 518). The second predefined threshold number of minutes may be, for example, 15 minutes, 30 minutes, 60 minutes, or the like.

If the computer determines that the selected security incident was last updated less than the second predefined threshold number of minutes ago, no output of step 518, then the process proceeds to step 556. If the computer determines that the selected security incident was last updated greater than the second predefined threshold number of minutes ago, yes output of step 518, then the computer makes a determination as to whether the selected security incident has a magnitude greater than a first predefined security incident magnitude threshold level (step 520). The first predefined security incident magnitude threshold level may be, for example, a magnitude threshold level of 0, 1, 2, or the like.

If the computer determines that the selected security incident has a magnitude less than the first predefined security incident magnitude threshold level, no output of step 520, then the process proceeds to step 556. If the computer determines that the selected security incident has a magnitude greater than the first predefined security incident magnitude threshold level, yes output of step 520, then the computer makes a determination as to whether the selected security incident has a magnitude less than a second predefined security incident magnitude threshold level (step 522). The second predefined security incident magnitude threshold level may be, for example, a magnitude threshold level of 5, 10, 20, or the like.

If the computer determines that the selected security incident has a magnitude greater than the second predefined security incident magnitude threshold level, no output of step 522, then the process proceeds to step 556. If the computer determines that the selected security incident has a magnitude less than the second predefined security incident magnitude threshold level, yes output of step 522, then the computer makes a determination as to whether the selected security incident is an active security incident (step 524).

If the computer determines that the selected security incident is an active security incident, yes output of step 524, then the process proceeds to step 528. If the computer determines that the selected security incident is not an active security incident, no output of step 524, then the computer makes a determination as to whether the selected security incident is an open security incident (step 526).

If the computer determines that the selected security incident is not an open security incident, no output of step 526, then the process proceeds to step 556. If the computer determines that the selected security incident is an open security incident, yes output of step 526, then the computer makes a determination as to whether a security incident source filter is defined (step 528). The security incident source filter may optionally be defined by a system administrator or security analyst, for example.

If the computer determines that a security incident source filter is not defined, no output of step 528, then the process proceeds to step 532. If the computer determines that a security incident source filter is defined, yes output of step 528, then the computer makes a determination as to whether a source of the selected security incident is listed in the security incident source filter (step 530). The source of the selected security incident may be, for example, a particular user, IP address, or file name.

If the computer determines that the source of the selected security incident is not listed in the security incident source filter, no output of step 530, then the process proceeds to step 556. If the computer determines that the source of the selected security incident is listed in the security incident source filter, yes output of step 530, then the computer makes a determination as to whether a security incident category filter is defined (step 532). The system administrator or security analyst also may optionally define the security incident category filter.

If the computer determines that a security incident category filter is not defined, no output of step 532, then the process proceeds to step 536. If the computer determines that a security incident category filter is defined, yes output of step 532, then the computer makes a determination as to whether a category of the selected security incident is listed in the security incident category filter (step 534). The category of the selected security incident may be, for example, denial of service attack, malware detection, anomalous user behavior, or the like.

If the computer determines that the category of the selected security incident is not listed in the security incident category filter, no output of step 534, then the process proceeds to step 556. If the computer determines that the category of the selected security incident is listed in the security incident category filter, yes output of step 534, then the computer performs local analysis of the selected security incident using a security information and event manager, such as security information and event manager 218 in FIG. 2 (step 536). In addition, the computer generates a result of the local analysis of the selected security incident (step 538).

Afterward, the computer makes a determination as to whether an observable exists in the result of the local analysis of the selected security incident (step 539). An observable is information, such as a file name, user name, registry key, and the like, within event logs of the security information and event manager that is of interest to security analysts. If the computer determines that an observable does not exist in the result, no output of step 539, then the process proceeds to step 556. If the computer determines that an observable does exist in the result, yes output of step 539, then the computer makes a determination as to whether the observable found in the result of the local analysis of the selected security incident is linked to another security incident (i.e., different from the selected security incident) (step 540). If the computer determines that the observable found in the result is linked to another security incident, yes output of step 540, then the computer makes a determination as to whether a magnitude of the other security incident is greater than the first predefined security incident magnitude threshold level (step 542). If the computer determines that the magnitude of the other security incident is greater than the first predefined security incident magnitude threshold level, yes output of step 542, then the process proceeds to step 560. If the computer determines that the magnitude of the other security incident is less than the first predefined security incident magnitude threshold level, no output of step 542, then the process proceeds to step 544.

Returning again to step 540, if the computer determines that the observable found in the result of the local analysis of the selected security incident is not linked to another security incident, no output of step 540, then the computer makes a determination as to whether the observable is a known malware hash or antivirus signature linked to the selected security incident based on the result of the local analysis of the selected security incident (step 544). If the computer determines that the observable is a known malware hash or antivirus signature linked to the selected security incident based on the result of the local analysis of the selected security incident, yes output of step 544, then the process proceeds to step 560. If the computer determines that the observable is not a known malware hash or antivirus signature linked to the selected security incident based on the result of the local analysis of the selected security incident, no output of step 544, then the computer makes a determination as to whether the observable linked to the selected security incident is found in private or public threat intelligence data (step 546).

If the computer determines that the observable linked to the selected security incident is found in private or public threat intelligence data, yes output of step 546, then the process proceeds to step 560. If the computer determines that the observable linked to the selected security incident is not found in private or public threat intelligence data, no output of step 546, then the computer makes a determination as to whether execution of the observable, which is a file, is linked to the selected security incident based on the result of the local analysis of the selected security incident (step 548).

If the computer determines that execution of the observable, which is a file, is linked to the selected security incident based on the result of the local analysis of the selected security incident, yes output of step 548, then the process proceeds to step 560. If the computer determines that no execution of the observable, which is a file, is linked to the selected security incident based on the result of the local analysis of the selected security incident, no output of step 548, then the computer makes a determination as to whether the observable linked to the selected security incident has a security risk score greater than a security risk threshold level (step 550).

If the computer determines that the observable linked to the selected security incident has a security risk score greater than the security risk threshold level, yes output of step 550, then the process proceeds to step 560. If the computer determines that the observable linked to the selected security incident has a security risk score less than the security risk threshold level, no output of step 550, then the computer makes a determination as to whether the observable, which is an asset, linked to the selected security incident has an asset weight greater than an asset weight threshold level (step 552).

If the computer determines that the observable, which is an asset, linked to the selected security incident has an asset weight greater than the asset weight threshold level, yes output of step 552, then the process proceeds to step 560. If the computer determines that the observable, which is an asset, linked to the selected security incident has an asset weight less than the asset weight threshold level, no output of step 552, then the computer makes a determination as to whether cloud analysis is enabled for all found security incidents (step 554).

If the computer determines that cloud analysis is not enabled for all found security incidents, no output of step 554, then the computer stops further analysis of the selected security incident (step 556). The computer also makes a determination as to whether another found security incident exists in the ranked list (step 558). If the computer determines that another found security incident does exist in the ranked list, yes output of step 558, then the process returns to step 514 where the computer selects the next highest-ranking security incident in the ranked list. If the computer determines that another found security incident does not exist in the ranked list, no output of step 558, then the process returns to step 502 where the computer waits until it is time to perform another search of the security incidents database.

Returning again to step 554, if the computer determines that cloud analysis is enabled for all found security incidents, yes output of step 554, then the computer sends the selected security incident for cloud-based analysis (step 560). Subsequently, the computer receives a result of the cloud-based analysis of the selected security incident (step 562). The computer adjusts the magnitude of the selected security incident based on the result of the cloud-based analysis (step 564).

Afterward, the computer makes a determination as to whether the adjusted magnitude of the selected security incident is greater than a security incident magnitude threshold level (step 566). If the computer determines that the adjusted magnitude of the selected security incident is less than the security incident magnitude threshold level, no output of step 566, then the process returns to step 558 where the computer determines whether another security incident exists in the ranked list. If the computer determines that the adjusted magnitude of the selected security incident is greater than the security incident magnitude threshold level, yes output of step 566, then the computer performs a set of mitigation action steps corresponding to the selected security incident (step 568). The set of mitigation action steps may include, for example, sending a security alert to the security analyst for review and possible action. In addition, the set of mitigation action steps may include the computer automatically blocking or terminating an activity or network session corresponding to the security incident. Thereafter, the process returns to step 558 where the computer determines whether another security incident exists in the ranked list.

Figure 6:
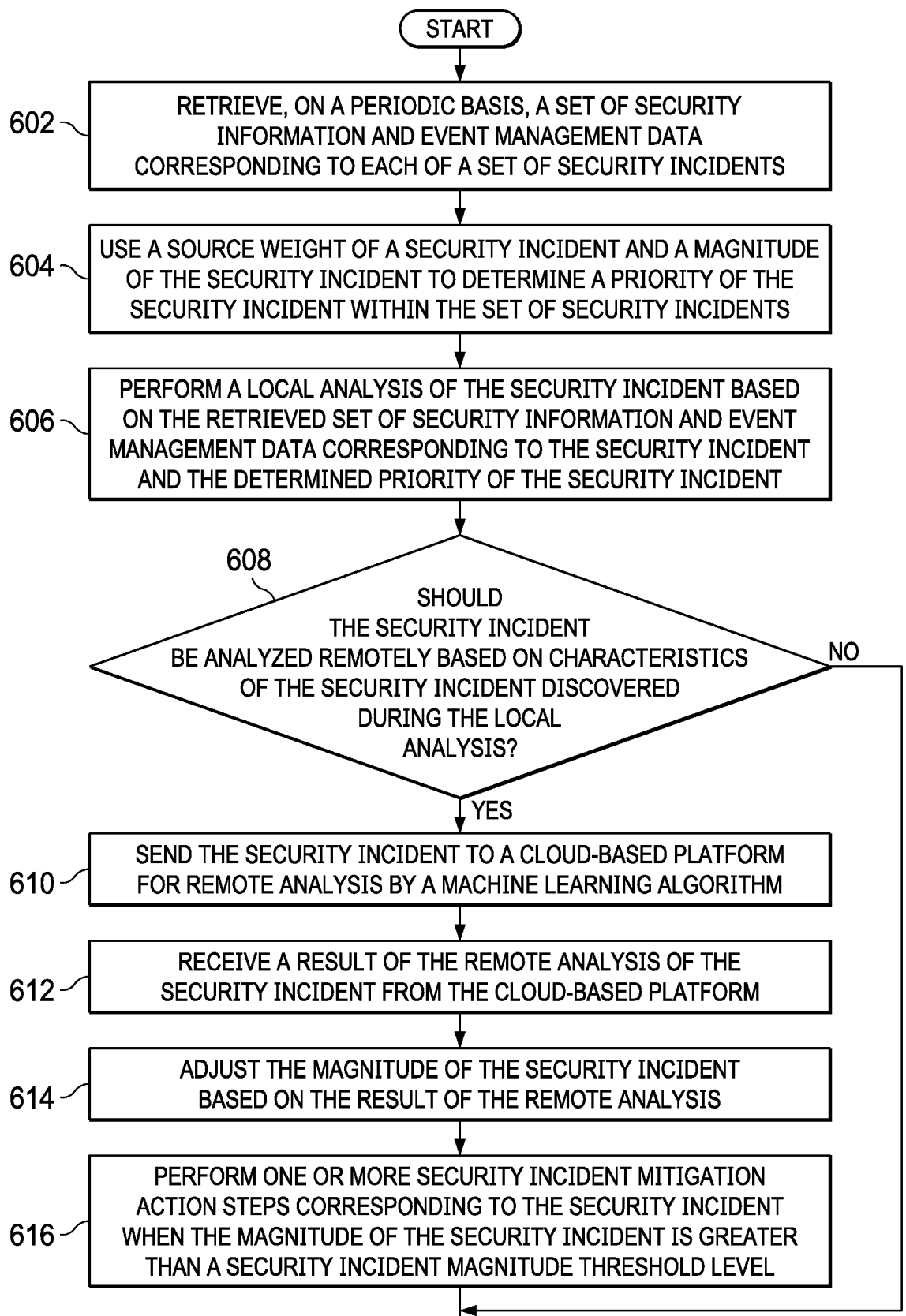
FIG. 6 is a flowchart illustrating a process for prioritizing security incidents for analysis in accordance with an illustrative embodiment.

With reference now to FIG. 6, a flowchart illustrating a process for prioritizing security incidents for analysis is shown in accordance with an illustrative embodiment. The process shown in FIG. 6 may be implemented in a computer, such as, for example, server 104 in FIG. 1.

The process begins when the computer retrieves, on a periodic basis, a set of security information and event management data corresponding to each of a set of security incidents (step 602). The computer uses a source weight of a security incident and a magnitude of the security incident to determine a priority of the security incident within the set of security incidents (step 604). The computer performs a local analysis of the security incident based on the retrieved set of security information and event management data corresponding to the security incident and the determined priority of the security incident (step 606).

In addition, the computer makes a determination as to whether the security incident should be analyzed remotely based on characteristics of the security incident discovered during the local analysis (step 608). A cloud-based platform may, for example, perform the remote analysis of the security incident. If the computer determines that the security incident should not be analyzed remotely based on the characteristics of the security incident discovered during the local analysis, no output of step 608, then no further analysis of the security incident is performed and the process terminates thereafter. If the computer determines that the security incident should be analyzed remotely based on the characteristics of the security incident discovered during the local analysis, yes output of step 608, then the computer sends the security incident to the cloud-based platform for remote analysis by a machine learning algorithm (step 610).

Subsequently, the computer receives a result of the remote analysis of the security incident from the cloud-based platform (step 612). The computer adjusts the magnitude of the security incident based on the result of the remote analysis (step 614). Further, the computer performs one or more security incident mitigation action steps corresponding to the security incident when the magnitude of the security incident is greater than a security incident magnitude threshold level (step 616). Thereafter, the process terminates.

Thus, illustrative embodiments of the present invention provide a computer-implemented method, computer system, and computer program product for identifying and selecting security incidents reported in security information and event management data for advanced automatic analysis utilizing local contextual data and remote cognitive security analytics. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for prioritizing security incidents for analysis, the method comprising:
   retrieving a set of security information and event management data corresponding to each of a set of security incidents;
   using a source weight of a security incident and a magnitude of the security incident to determine a priority of the security incident within the set of security incidents; and
   performing a local analysis of the security incident based on the retrieved set of security information and event management data corresponding to the security incident and the determined priority of the security incident.

2. The method of claim 1 further comprising:
   determining whether the security incident is to be analyzed remotely based on characteristics of the security incident discovered during the local analysis;
   responsive to determining that the security incident is to be analyzed remotely based on the characteristics of the security incident discovered during the local analysis, sending the security incident for remote analysis; and
   receiving a result of the remote analysis of the security incident.

3. The method of claim 2 further comprising:
   adjusting the magnitude of the security incident based on the result of the remote analysis; and
   performing a security incident mitigation action step corresponding to the security incident when the magnitude of the security incident is greater than a security incident magnitude threshold level.

4. The method of claim 2, wherein the characteristics of the security incident discovered during the local analysis include at least one of an observable linked to the security incident, the observable is listed in threat intelligence data, the observable has a security risk score above a threshold, the observable is a known malware hash linked to the security incident, execution of the observable that is a file linked to the security incident, and the observable that is an asset linked to the security incident has an asset weight greater than an asset weight threshold.

5. The method of claim 2, wherein the remote analysis is performed by a machine learning algorithm of a cloud-based platform.

6. The method of claim 1 further comprising:
   determining whether new and unanalyzed security incidents are found during a search of a security incidents database;
   responsive to determining that one or more new or unanalyzed security incidents were found during the search of the security incidents database, sorting the found security incidents in descending order by security incident source weight and security incident magnitude of each found security incident;
   generating a ranked list of the found security incidents based on the sorting according to the security incident source weight and magnitude of each found security incident; and
   selecting a high-ranking security incident in the ranked list.

7. The method of claim 6 further comprising:
   applying thresholds to the selected security incident;
   determining whether the selected security incident is to be analyzed locally based on applying the thresholds to the selected security incident; and
   responsive to determining that the selected security incident is to be analyzed locally, performing the local analysis of the selected security incident using a security information and event manager.

8. The method of claim 7, wherein the thresholds include a plurality of security incident time thresholds and a plurality of security incident magnitude thresholds.

9. The method of claim 6 further comprising:
   applying filters to the selected security incident;
   determining whether the selected security incident is to be analyzed locally based on applying the filters to the selected security incident; and
   responsive to determining that the selected security incident is to be analyzed locally, performing the local analysis of the selected security incident using a security information and event manager.

10. The method of claim 9, wherein the filters include a security incident source filter and a security incident category filter.

11. The method of claim 1, wherein the set of security information and event management data corresponding to each of a set of security incidents is retrieved on a periodic basis.

12. The method of claim 1, wherein a current analysis status of the security incident is also used to determine the priority of the security incident within the set of security incidents.

13. A computer system for prioritizing security incidents for analysis, the computer system comprising:
   a bus system;
   a storage device connected to the bus system, wherein the storage device stores program instructions; and a processor connected to the bus system, wherein the processor executes the program instructions to:

retrieve a set of security information and event management data corresponding to each of a set of security incidents;

use a source weight of a security incident and a magnitude of the security incident to determine a priority of the security incident within the set of security incidents; and perform a local analysis of the security incident based on the retrieved set of security information and event management data corresponding to the security incident and the determined priority of the security incident.

14. The computer system of claim 13, wherein the processor further executes the program instructions to:

determine whether the security incident is to be analyzed remotely based on characteristics of the security incident discovered during the local analysis;

send the security incident for remote analysis in response to determining that the security incident is to be analyzed remotely based on the characteristics of the security incident discovered during the local analysis; and receive a result of the remote analysis of the security incident.

15. The computer system of claim 14, wherein the processor further executes the program instructions to:

adjust the magnitude of the security incident based on the result of the remote analysis; and perform a security incident mitigation action step corresponding to the security incident when the magnitude of the security incident is greater than a security incident magnitude threshold level.

16. The computer system of claim 14, wherein the characteristics of the security incident discovered during the local analysis include at least one of an observable linked to the security incident, the observable is listed in threat intelligence data, the observable has a security risk score above a threshold, the observable is a known malware hash linked to the security incident, execution of the observable that is a file linked to the security incident, and the observable that is an asset linked to the security incident has an asset weight greater than an asset weight threshold.

17. A computer program product for prioritizing security incidents for analysis, the computer program product comprising a computer readable storage medium having program instructions embodied therewith, the program instructions executable by a computer to cause the computer to perform a method comprising:

retrieving a set of security information and event management data corresponding to each of a set of security incidents;

using a source weight of a security incident and a magnitude of the security incident to determine a priority of the security incident within the set of security incidents; and performing a local analysis of the security incident based on the retrieved set of security information and event management data corresponding to the security incident and the determined priority of the security incident.

18. The computer program product of claim 17 further comprising:

determining whether the security incident is to be analyzed remotely based on characteristics of the security incident discovered during the local analysis;

responsive to determining that the security incident is to be analyzed remotely based on the characteristics of the security incident discovered during the local analysis, sending the security incident for remote analysis; and receiving a result of the remote analysis of the security incident.

19. The computer program product of claim 18 further comprising:

adjusting the magnitude of the security incident based on the result of the remote analysis; and performing a security incident mitigation action step corresponding to the security incident when the magnitude of the security incident is greater than a security incident magnitude threshold level.

20. The computer program product of claim 18, wherein the characteristics of the security incident discovered during the local analysis include at least one of an observable linked to the security incident, the observable is listed in threat intelligence data, the observable has a security risk score above a threshold, the observable is a known malware hash linked to the security incident, execution of the observable that is a file linked to the security incident, and the observable that is an asset linked to the security incident has an asset weight greater than an asset weight threshold.

* * * * *